No. 897,244. PATENTED AUG. 25, 1908.
O. O. WHITE.
THERMOSTATIC BOILER FEED REGULATOR.
APPLICATION FILED APR. 3, 1908.
3 SHEETS—SHEET 1.
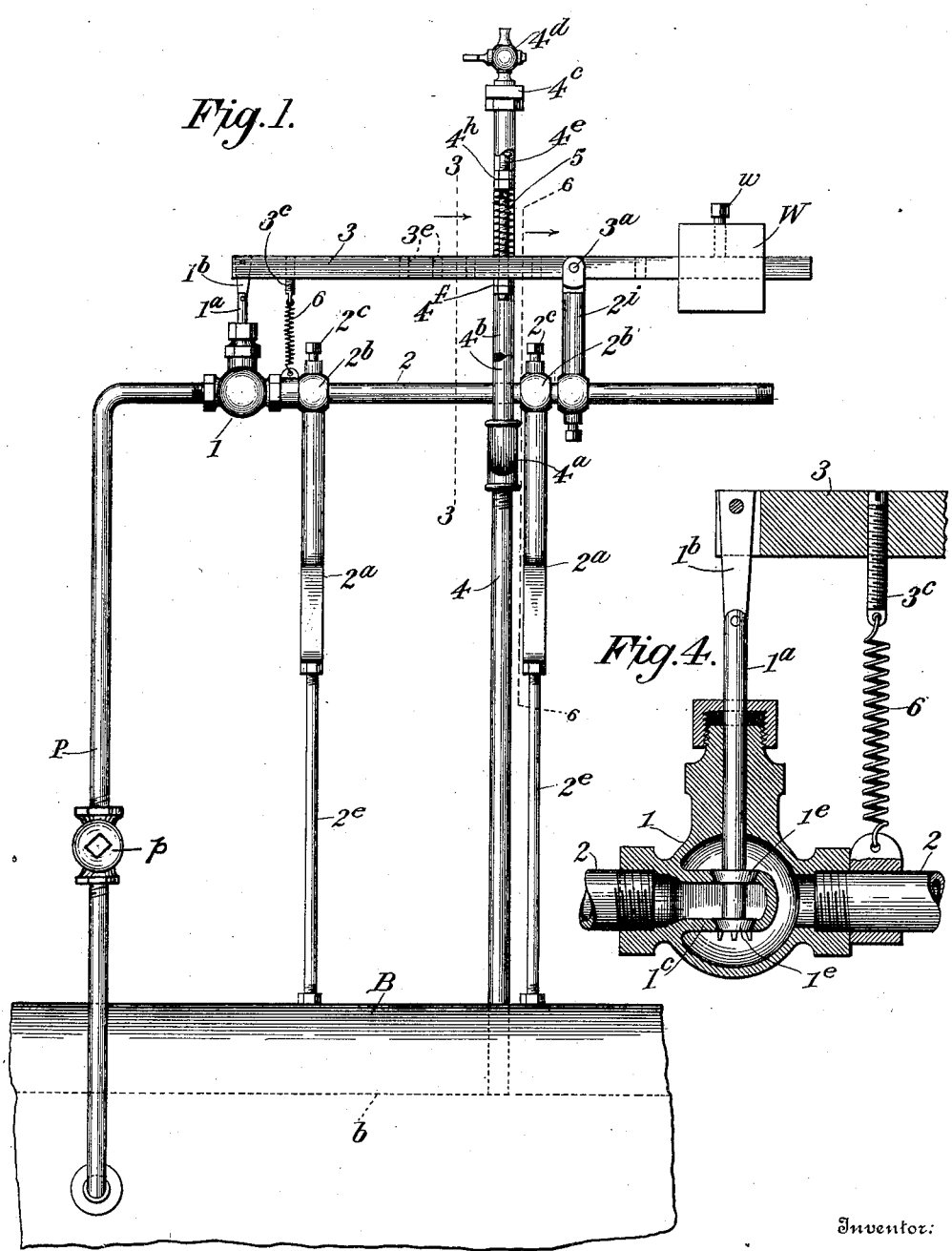
Inventor:
Orris O. White

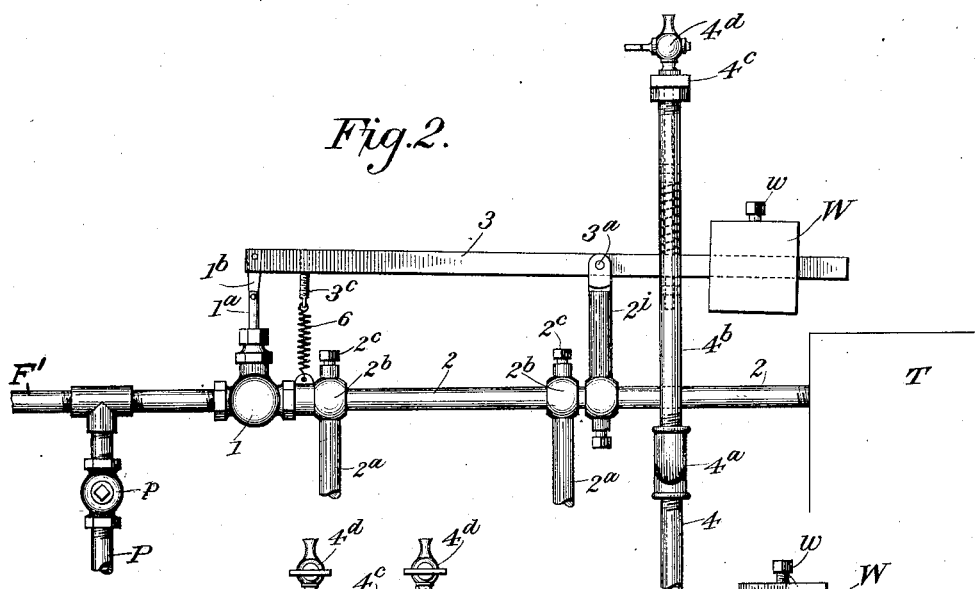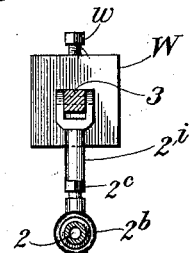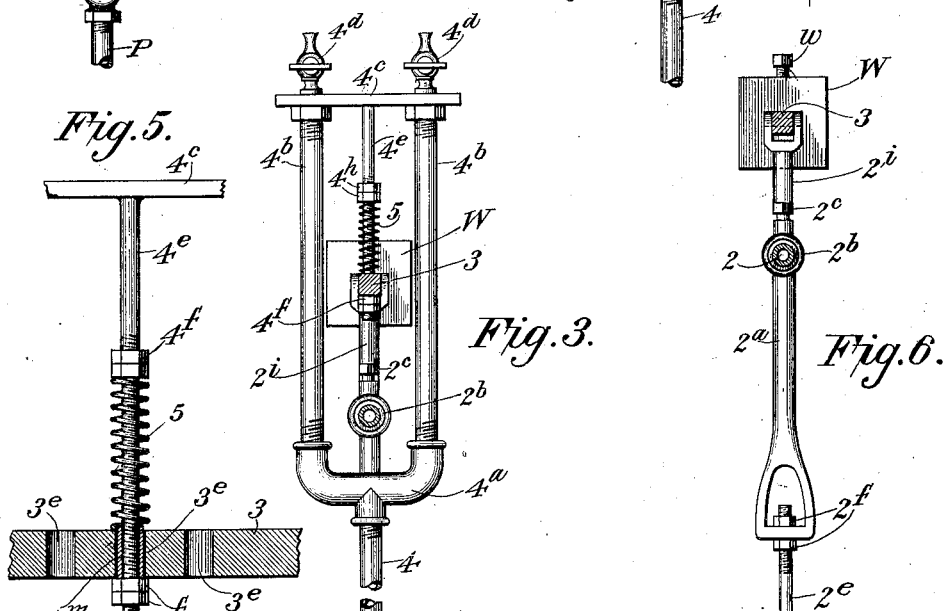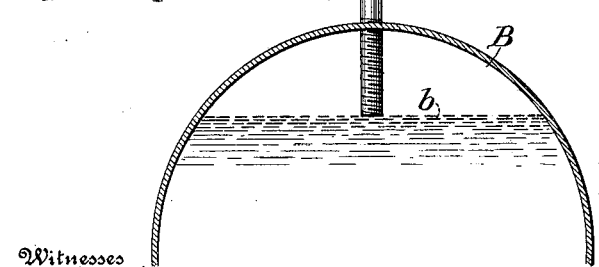

No. 897,244. PATENTED AUG. 25, 1908.
O. O. WHITE.
THERMOSTATIC BOILER FEED REGULATOR.
APPLICATION FILED APR. 3, 1908.
3 SHEETS—SHEET 3.
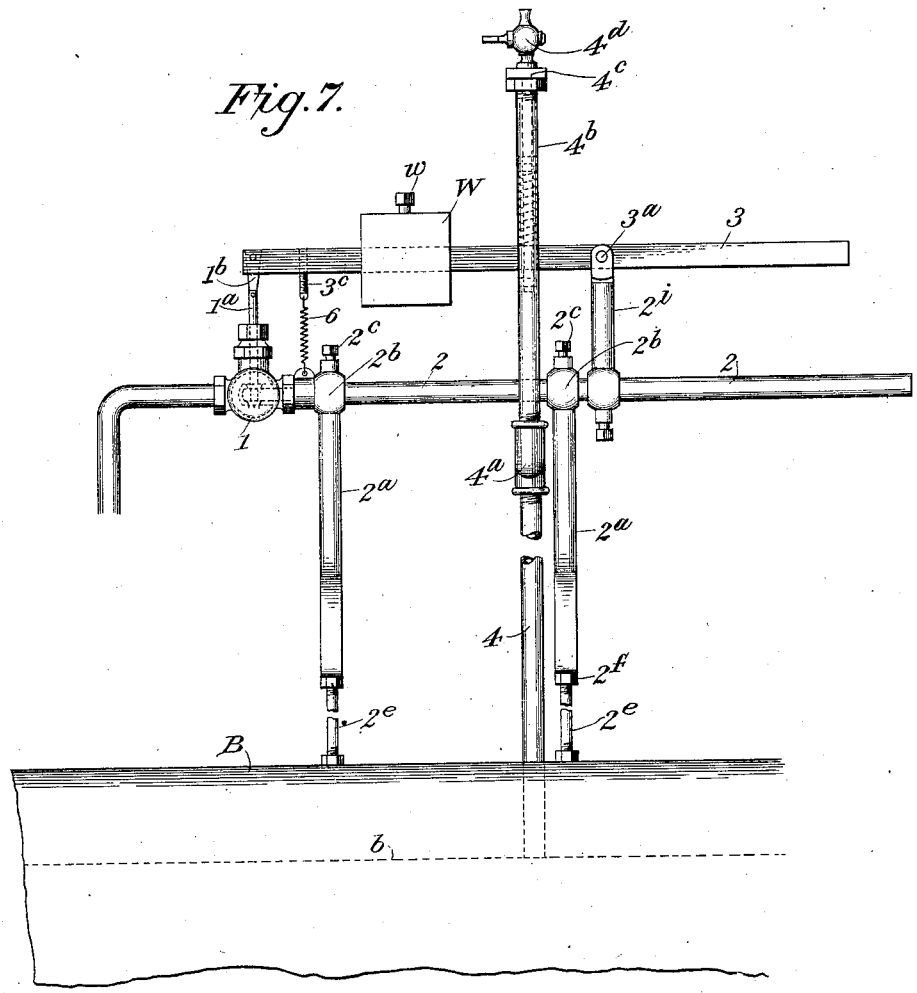
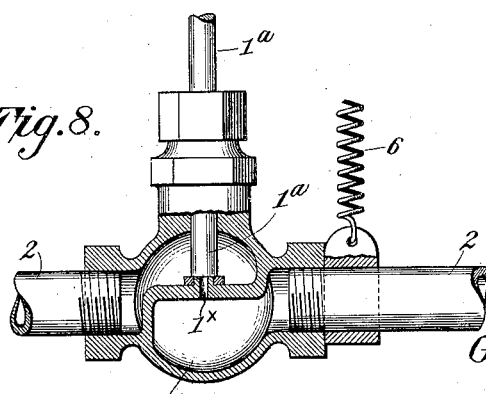
Inventor:
Orris O. White
Witnesses
By
Attorneys

UNITED STATES PATENT OFFICE.

ORRIS O. WHITE, OF GARLAND, PENNSYLVANIA.

THERMOSTATIC BOILER-FEED REGULATOR.

No. 897,244.      Specification of Letters Patent.      Patented Aug. 25, 1908.

Application filed April 3, 1908. Serial No. 424,875.

*To all whom it may concern:*

Be it known that I, ORRIS O. WHITE, of Garland, in the county of Warren and State of Pennsylvania, have invented certain new and useful Improvements in Thermostatic Boiler-Feed Regulators; and I hereby declare that the following is a full, clear, and exact description thereof, reference being had to the accompanying drawings, which form part of this specification.

This invention is an improvement in thermostatic controlled feed-water regulators for boilers, hot water heaters, and the like; and its object is to provide a very efficient thoroughly reliable and sensitive device for automatically controlling the water feed; and which is adapted for use with the various kinds of devices whereby the water is fed to the boiler either only on occasion, or continuously. In the latter cases the regulator is connected so as to divert the supply when not needed.

The invention will be clearly understood from the accompanying drawings in connection with the following description thereof, and I refer to the claims for statements of the parts and combinations of parts for which protection is desired.

In said drawings—Figure 1 is a side elevation of the complete thermostatic feed water regulator, partly broken away, as attached to one kind of boiler, and being illustrated as adapted for use for example in connection with a feed pump. Fig. 2 is a similar view of the device as arranged for use in connection with a continous feed. Fig. 3 is a section on line 3—3, Fig. 1. Fig. 4 is an enlarged section through a balanced valve used in Figs. 1 and 7. Fig. 5 is an enlarged detail section of the connection between the thermostat and lever. Fig. 6 is a detail section on line 6—6, of Fig. 1, showing one of the standards. Fig. 7 is a view showing the regulator arranged to control an injector feed. Fig. 8 is a detail view of another form of valve used in connection with low pressure boilers for hot water heating systems.

Referring to the drawings, B represents a boiler, or hot water heater of any desired construction, in which it is desired to maintain water or liquid at a uniform level, as indicated at $b$. I will hereinafter refer to it as a "boiler". This is supplied with water through a feed-pipe P, connected therewith in any desired or usual manner, both boiler and feed pipe being merely conventionally shown in the drawings.

As shown in Fig. 1, the feed-pipe P is connected at its upper end with a valve 1, which is in turn connected with a pipe or duct 2, that is connected with any suitable water supply, or supplier, not shown. The duct 2 is, or may be, supported upon the boiler by means of standards which, as shown, are each formed of an upper member $2^a$, and lower member $2^e$. The upper member $2^a$ has an eye $2^b$ through which the duct 2 passes, and is fastened thereto by means of a set screw $2^c$; and the lower end of the member $2^a$ is stirrup-shaped, and the upper threaded end of the lower member $2^e$ extends into this stirrup and is secured thereto by nuts $2^f$ above and below the stirrup foot, as shown in Fig. 6. The lower end of member $2^e$ is threaded and attached to the shell of the boiler, either as shown in Fig. 6, or in other suitable manner. By means of these adjustable standards, the duct 2 can be alined and held in horizontal position, but I do not restrict the invention to the particular form of such standards.

The valve has a stem $1^a$ connected by a pivoted link $1^b$ to one end of a lever 3, which, as shown, is pivoted at $3^a$ upon a standard $2^i$ fastened to and rising from the duct 2. And on this lever is mounted an adjustable weight W, secured in position by means of a set screw $w$. This lever 3 is connected with the thermostat, which, as shown more clearly in Fig. 3, is approximately Y-shaped, and has a lower tubular tang portion 4 provided with a tee $4^a$ on its upper end, (below duct 2), from which tee rise two tubular portions $4^b$ which are substantially parallel and are connected and braced at top by a tie $4^c$, and may have blow-off cocks $4^d$ attached to their upper ends. The lower end of member 4 extends into the steam space of the boiler to the water line $b$ and when the water is at the desired level in the boiler the inner end of the thermostat will be closed thereby, consequently the exterior portions of the thermostat will be cool; but if the water falls below the desired level, steam will enter the thermostat, and as it is made of brass, or other expansive metal, it will elongate when heated and the tie $4^c$ will be moved further from the boiler.

To the tie $4^c$ is attached a depending rod $4^e$, which extends through an aperture $3^e$ in lever 3, and is provided with setting and jam-nuts 4$^f$ below the lever. Said lever 3 has a series of holes 3$^e$ in it, in any of which the rod 4$^e$ may be engaged, thus facilitating the adjustment of the device to its working conditions.

A coiled spring 5 is placed on the rod 4$^e$ above lever 3, and bears against the upper side of said lever and the underside of setting and jam-nuts 4$^h$ on rod 4$^e$, by which the tension of the spring and pressure of lever 3 against nuts 4$^f$ is regulated. In order to prevent lever 3 catching on the threads of rod 4$^e$ I may place a loose sleeve 4$^m$ around the lower end of rod 4$^e$, where it passes through hole 3$^e$; the spring 5 bearing on the lever exterior to said sleeve. The object of this peculiar connection between the lever and the thermostat is to prevent distortion of, or undue strain upon, the parts, if the boiler should be allowed to get cold; in which case the unusual contraction of the thermostat would simply put additional compression on spring 5, and rod 4$^e$ would slightly descend through the lever, separating the nuts 4$^f$ therefrom; whereas if there was a rigid connection between the thermostat and lever, this unusual contraction would force some of the parts to spring, and thus affect the adjustment thereof when the boiler was again fired.

The object of making the thermostat bifurcated and passing the lever 3 through the bifurcations, is to keep the strain of expansion directly in line with the tang 4, so that it will not be bent or sprung when expanded—whereas if the lever 3 was arranged at one side of the tang, the strain of the expansions would be exerted from the side and would tend to bend and bow the tang 4,—and speedily destroy the adjustment, or possibly the utility, of the thermostat—as bowing of the tang would lessen the expansion effect.

To facilitate and insure the quick closing of the valve, after the thermostat has actuated the lever 3 and contracted, I provide a spring 6 connected to a collar on duct 2 and to a screw 3$^c$ tapped through the lever 3 near the valve.

The valve I customarily use is a two-way balanced valve, as shown in Fig. 4, such valve having a double wall partition 1$^c$, provided with two alined seats, to which are fitted valve disks 1$^e$, both on the stem 1$^a$, and of substantially the same size, and as the pressure is exerted on the back of one valve disk and on the face of the other, they are substantially equipoised. In some cases a valve having only a single port, as shown in Fig. 8, may be used; in these cases I prefer to make the single port 1$^×$ very small, and close it by the lower end of the stem 1$^a$, so that there will be practically no pressure to overcome in opening or closing the valve.

When the regulator is to be used with boilers supplied directly by a water main, or reservoir; or by a feed pump or automatic steam injector, I preferably employ the balanced valve (Fig. 4) and arrange the parts as shown in Fig. 1, with the thermostat connected to the lever at a point intermediate its pivot 3$^a$ and the valve 1. In setting up such device, the spring 6 is first relaxed so as to have no appreciable effect upon the lever; then the weight W is adjusted to practically exactly counterbalance the valve. Then spring 6 is adjusted so as to normally tend to close the valve if it be unseated,—only a very slight pressure being exerted by the spring 6, which is intended to give the valve a quick action in closing, and to prevent sticking of the valve should the spring 5 fail to effect its closure when the thermostat contracts. The shank of the thermostat having been previously adjusted to the proper depth in the boiler, and water having been raised to the desired level therein, closing the thermostat, the nuts 4$^f$ are set up against the underside of the lever 3, but not sufficiently to unseat the valve; and the nuts 4$^h$ are then set down to put the desired tension on spring 5, and insure close contact between the lever and nuts 4$^f$. The parts being then in the position shown in Fig. 1, should the water drop below the proper level, steam will enter the thermostat which will expand almost instantly, thereby causing lever 3 to open the valve, whereupon water flows into the boiler until it rises to the desired level and closes the thermostat; which will then cool very quickly, and as it contracts the valve will be closed by the action of springs 5 and 6.

Instead of the duct 2 being a water duct, it could be used as a steam duct, and connected with an injector feeder (not shown) in the well known manner; the operation being the same as described, except that the regulator indirectly controls the water feed, by controlling the supply of steam, instead of directly controlling the water-supply pipe.

Some boilers have a continuous supply of water, which is simply diverted when the proper amount is in the boiler; when used in connection with such supply devices, the parts may be arranged as in Fig. 2, with the pivot of the lever in advance of the thermostatic connection therewith. Thus as shown in Fig. 2, F' is the feed pipe connected with valve 1 and P is the feed pipe connected with the boiler. $p$ is a check valve in the feed pipe. When valve 1 is closed the water is forced through the check-valve $p$ into pipe P. But when valve 1 is open the water will pass through duct 2 into a tank or receiver T. In this case the valve will be normally open, but will be closed upon expansion of the thermostat. The regulator may also be used to control the supply of steam to automatic injectors of certain types wherein it is desired to continually supply steam to the injector so as to keep it operating, but without sufficient power to force the water into the boiler. By increasing the supply of steam the power of the injector will be increased and water will be forced into the boiler. In such cases the arrangement shown in Fig. 1 may be used, but with the valve 1 reversed and the weight W removed or preferably shifted to the left-hand side of the pivot and thermostat, as shown in Fig. 7, so that it will co-act with spring 6 in holding the valve partially closed against steam pressure; duct 2 in this instance is connected with the steam space and is used as a steam duct to supply the injector (not shown) which operates the water supply. In this manner (as shown in Fig. 7) the valve may be held partially closed under any desired pressure, but when the thermostat expands the valve will be fully opened thereby and a full head of steam supplied to the injector. The thermostat in such cases will open the valve against the resistance of the weight and spring. The blow-off cocks 4$^d$ should be opened occasionally so as to allow any matters accumulated in the thermostat to blow out, and thus insure the thermostat continuing in thorough efficient working order.

Having described my invention what I claim as new and desire to secure by Letters Patent is:

1. In a thermostatic regulator, the combination of a boiler, a duct, a valve therein, a pivoted lever and connections between the lever and the valve stem; with a thermostat communicating with the boiler at the water level, and a rod connected with the thermostat and yieldingly connected with the lever in the direction of contraction of the thermostat, means for adjusting the point of contact between the lever and rod connections, and a spring for holding the said connections in yielding contact.

2. In a thermostatic feed water regulator, the combination of a boiler, a duct, a valve therein, a lever pivoted beside the duct, and connections between one end of the lever and the valve stem, a thermostat communicating with the water level in the boiler, a rod connected with the thermostat and extending through an aperture in the lever, a device for adjusting the contact between the lever and rod, and a spring for holding the lever and rod in yielding contact.

3. In a thermostatic feed water regulator, the combination of a duct, a valve therein, a lever pivoted beside the duct, connections between the lever and the valve stem, a thermostat and a rod connected with the thermostat, a device for adjusting the contact between the lever and rod, and a spring for holding the lever and rod in yielding contact; a weight adjustably mounted on the lever, and a spring connected to a fixed point and to the lever adjacent the valve.

4. In combination, a duct, supports therefor, a valve in said duct, a thermostat extending to the water level in the boiler and branched below the duct, its branches extending above the duct, a tie connecting the branches of the thermostat above the duct, a pivoted lever extending between the branches of the thermostat above the duct, a link connection between one end of said lever and the valve stem, a connection between the tie-rod and the said lever; an adjustable weight on said lever, and a spring connected to said lever and duct at a point adjacent the valve.

5. In combination, a boiler, a duct, a bifurcated thermostat having its stem extending to the boiler and to the water line thereof, and extending above the duct, a standard on said duct, a valve in said duct, a lever pivoted on said standard and having one end connected to said valve stem, a tie-rod connected to the bifurcations of the thermostat and to the lever, adjustable nuts on the rod below the lever, a spring on the rod above the lever, and nuts for adjusting the spring.

6. In combination, a boiler, a duct, a bifurcated thermostat having its stem extending to the boiler and to the water line thereof, and its bifurcations extending above the duct, a standard on said duct, a valve in said duct, a lever pivoted on said standard and having one end connected to said valve stem, a tie-rod connected to the bifurcations of the thermostat and to the lever, a spring on the rod above the lever; with a weight adjustably mounted on the lever, and a spring connected with one end of the lever adjacent the valve.

7. In combination with a boiler, a duct, adjustable standards supporting said duct on the boiler, a bifurcated thermostat having its stem extending to the boiler and to the water line thereof, and its bifurcations extending above the duct, a standard on said duct, a valve in said duct, a lever pivoted on said standard and having one end connected to said valve stem, a tie-rod connected to the bifurcations of the thermostat and depending through an aperture in the lever, adjustable nuts on the rod below the lever, a spring on the rod above the lever, and nuts for adjusting the spring.

8. In combination with a boiler, a duct, adjustable standards supporting said duct on the boiler, a bifurcated thermostat having its stem extending to the boiler and water line thereof, and its bifurcations extending above the duct, a standard on said duct, a valve in said duct, a lever pivoted on said standard and having one end connected to said valve stem, a tie-rod connected to the bifurcations of the thermostat and depending through an aperture in the lever, adjustable nuts on the rod below the lever, a spring on the rod above the lever, and nuts for adjusting the spring; with a weight adjustably mounted on the lever, and a spring having one end adjustably connected with the end of the lever adjacent the valve, and its other end connected with the duct, substantially as described.

9. In a thermostatic feed water regulator, the combination of a duct, a valve therein, a pivoted lever beside the duct, a connection between one end of the lever and the valve stem, a bifurcated thermostat communicating with the boiler at the water level, and a connection between the extremities of both members of the thermostat and the lever, said connection being yieldable in the direction of contraction of the thermostat.

10. In combination, a duct, supports therefor, a valve in said duct, a thermostat extending to the water level in the boiler and branched below the duct, its branches being of similar material and size and extending above the duct, a pivoted lever extending between the branches of the thermostat above the duct, a connection between one end of said lever and the valve stem, and a connection between the upper ends of both branches of the thermostat and the said lever.

11. In combination, a duct, supports therefor, a valve in said duct, a thermostat extending to the water level in the boiler and branched below the duct, its branches being of similar material and size and extending above the duct, a tie connecting the branches of the thermostat above the duct, a pivoted lever extending between the branches of the thermostat above the duct and below the tie, a link connection between one end of said lever and the valve stem, and a rod connected with the tie and extending through an aperture in the lever, and a weight on said lever, substantially as described.

12. In combination, a duct, supports therefor, a valve in said duct, a thermostat extending to the water level in the boiler and branched above the boiler, its branches extending above the duct, a pivoted apertured lever above the duct intermediate the branches of the thermostat, a connection between one end of said lever and the valve stem, a rod connected with the upper ends of the thermostat branches and extending through an aperture in the lever, and means for adjusting the point of operative contact between the rod and the lever; and an adjustable weight on said lever.

In testimony that I claim the foregoing as my own, I affix my signature in presence of two witnesses.

ORRIS O. WHITE.

Witnesses:
JOHN L. FLETCHER,
ARTHUR E. DOWELL.